US008573413B2

(12) United States Patent
Sh

(10) Patent No.: US 8,573,413 B2

(45) Date of Patent: Nov. 5, 2013

(54) ANTI-THEFT HAND TOOL RACK

(76) Inventor: Jen-Ji Sh, Taichung (TW)

( * ) Notice: Subject to any disclaimer, the term of this patent is extended or adjusted under 35 U.S.C. 154(b) by 77 days.

(21) Appl. No.: 13/300,681

(22) Filed: Nov. 21, 2011

(65) Prior Publication Data

US 2013/0126449 A1 May 23, 2013

(51) Int. Cl.
*B62H 3/04* (2006.01)

(52) U.S. Cl.
USPC .......... 211/70.6

(58) Field of Classification Search
USPC .......... 211/70.6, 69, 69.1; 206/378, 377, 372, 206/379, 493, 376, 349; 248/224.8, 222.41, 248/225.21, 291.1
See application file for complete search history.

(56) References Cited

U.S. PATENT DOCUMENTS

| | | | | |
|---|---|---|---|---|
| 5,893,457 | A * | 4/1999 | Wei | 206/373 |
| 5,967,340 | A * | 10/1999 | Kao | 211/70.6 |
| 6,079,559 | A * | 6/2000 | Lee | 206/378 |
| 6,092,656 | A * | 7/2000 | Ernst | 206/378 |
| 6,386,363 | B1 * | 5/2002 | Huang | 206/378 |
| 6,508,360 | B1 * | 1/2003 | Chen | 206/378 |
| 6,536,611 | B2 * | 3/2003 | Chen | 211/70.6 |
| 6,547,074 | B1 * | 4/2003 | Chen | 206/379 |
| 6,669,032 | B2 * | 12/2003 | Kao | 211/70.6 |
| 6,698,600 | B1 * | 3/2004 | Lee | 211/70.6 |
| 6,742,653 | B2 * | 6/2004 | Kao | 206/373 |
| 6,902,058 | B1 * | 6/2005 | Chang | 206/378 |
| 6,988,616 | B2 * | 1/2006 | Chen | 206/379 |
| 7,077,275 | B2 * | 7/2006 | Kao | 211/70.6 |
| 7,080,733 | B2 * | 7/2006 | Kao | 206/372 |
| 7,100,777 | B1 * | 9/2006 | Kao | 211/70.6 |
| 7,210,578 | B2 * | 5/2007 | Tuan-Mu et | 206/378 |
| 7,328,797 | B2 * | 2/2008 | Lin | 206/379 |
| 7,434,688 | B2 * | 10/2008 | Hu | 206/377 |
| 7,523,832 | B2 * | 4/2009 | Kao | 211/70.6 |
| 7,624,863 | B2 * | 12/2009 | Meng | 206/349 |
| 7,699,176 | B2 * | 4/2010 | Lin | 206/759 |
| 8,205,758 | B2 * | 6/2012 | Shih | 211/70.6 |
| 8,307,980 | B1 * | 11/2012 | Kao | 206/378 |
| 8,376,153 | B1 * | 2/2013 | Lee | 211/70.6 |
| 8,381,905 | B1 * | 2/2013 | Kao | 206/378 |
| 2003/0024837 | A1 * | 2/2003 | Chen | 206/378 |
| 2003/0070999 | A1 * | 4/2003 | Kao | 211/70.6 |
| 2003/0102275 | A1 * | 6/2003 | Kao | 211/70.6 |
| 2003/0213760 | A1 * | 11/2003 | Lee | 211/70.6 |
| 2004/0188366 | A1 * | 9/2004 | Tong | 211/70.6 |
| 2010/0170817 | A1 * | 7/2010 | Wu | 206/378 |

* cited by examiner

*Primary Examiner* — Jennifer E Novosad

(57) ABSTRACT

A hand tool rack comprising main frame, positioning members and cover frame. The main frame includes two side panels and a mediate portion between the side panels. Each side panel has hook trough and lump. The positioning members mount on the mediate portion and allow hand tool to position. The cover frame has two brace pieces, and each brace piece has hook and guiding slot. When the brace pieces are hooked with the side panels, each hook is clipped into the corresponding hook trough and each lump is lodged into the corresponding guiding slot. Therefore, the hand tool rack is ensured to be anti-theft and user-friendly.

9 Claims, 12 Drawing Sheets

ANTI-THEFT HAND TOOL RACK

FIELD OF THE INVENTION

The present invention relates to a hand tool rack, particularly to a tool rack which allows hand tools to be placed with anti-theft and user-friendly functions.

BACKGROUND OF THE INVENTION

A conventional tool rack as disclosed in U.S. Pat. No. 6,092,656 generally includes a body and a connection member, the body has two locking portions respectively located on two sides thereof and a positioning portion is located at the mediate portion of the base. Multiple blocks extend from the positioning portion. The connection member includes multiple rods extending therefrom and located corresponding to the blocks. The connection member has two connection portions respectively located on two ends thereof so as to be connected with the locking portions to connect the base to the connection member. The tools each have two ends which are positioned between the rod and the blocks.

However, a disadvantage of the prior art exists. When the hand tools are about to be retrieved, the locking portions must be cut off first for the main frame to be separated from the connection member and then the hand tools can be retrieved. Once the locking portions are cut off, the connection member is no longer able to be attached back onto the main frame. Consequently, the hand tool rack of the prior art has anti-theft function only if it is unused. As long as the tool rack is purchased and used, the connection member will be detached from the main frame and the hand tools will be falling or missing easily.

SUMMARY OF THE INVENTION

The object of the present invention is to provide a hand tool rack with anti-theft and user-friendly functions. It comprises a main frame, a plurality of positioning members and at least a cover frame. The main frame includes two side panels and a mediate portion between the side panels. A hook trough and a lump are symmetrically designated on each side panel. One end of the positioning member allows a hand tool to mount with and the other end is attached onto the mediate portion of the main frame. The cover frame has two brace pieces laterally extended from its two ends respectively. On each brace piece, a hook is stuck out and a guiding slot is defined on the side of its end. When the brace pieces are hooked with the side panels, each hook is clipped into the corresponding hook trough and each lump is lodged into the corresponding guiding slot. Therefore, the hand tool rack is ensured to be anti-theft and user-friendly.

DETAILED DESCRIPTION OF THE PREFERRED EMBODIMENT

Figure 1:
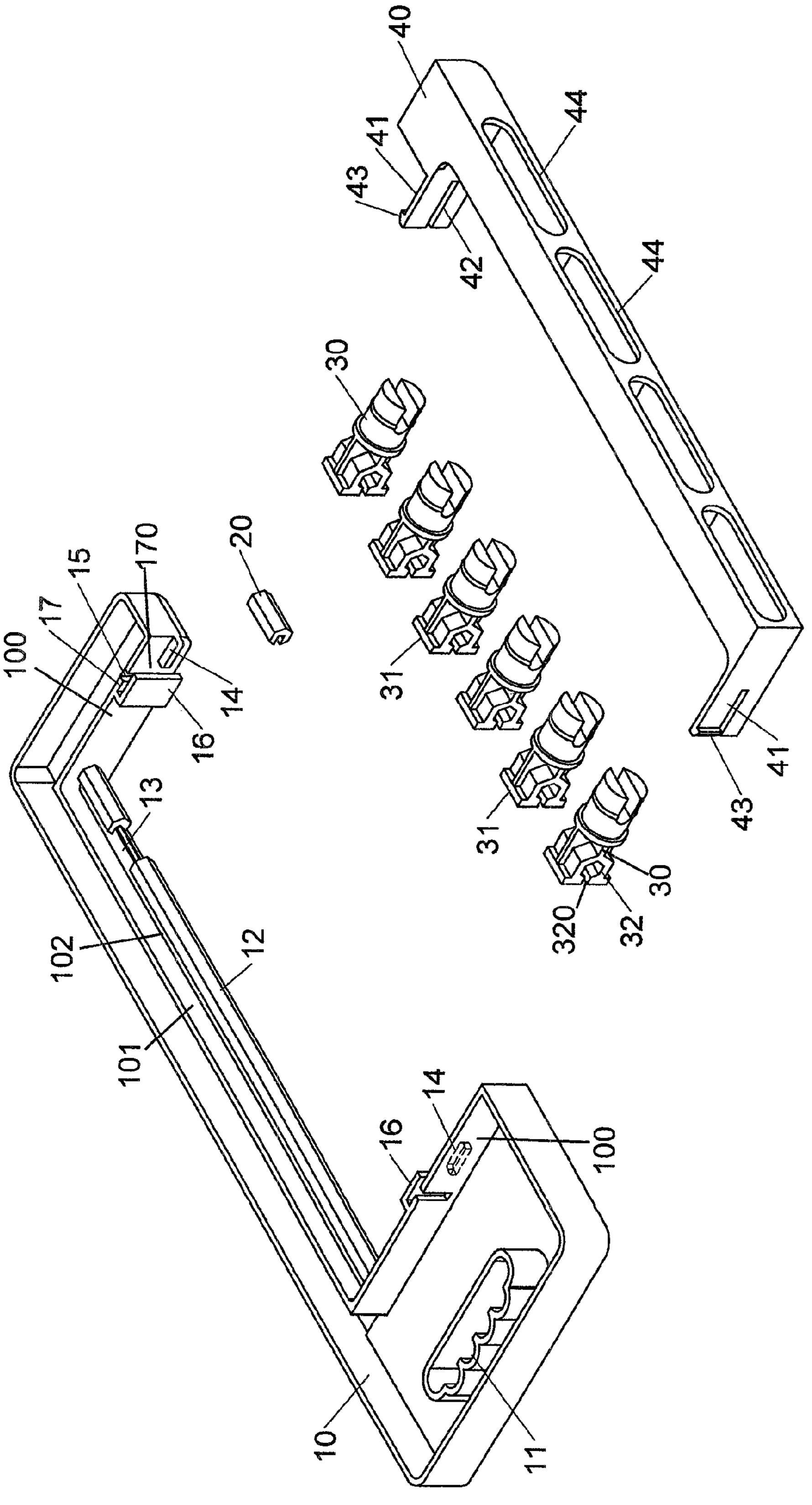
FIG. 1 is an exploded perspective view of the hand tool rack in accordance with the present invention.
Figure 2:
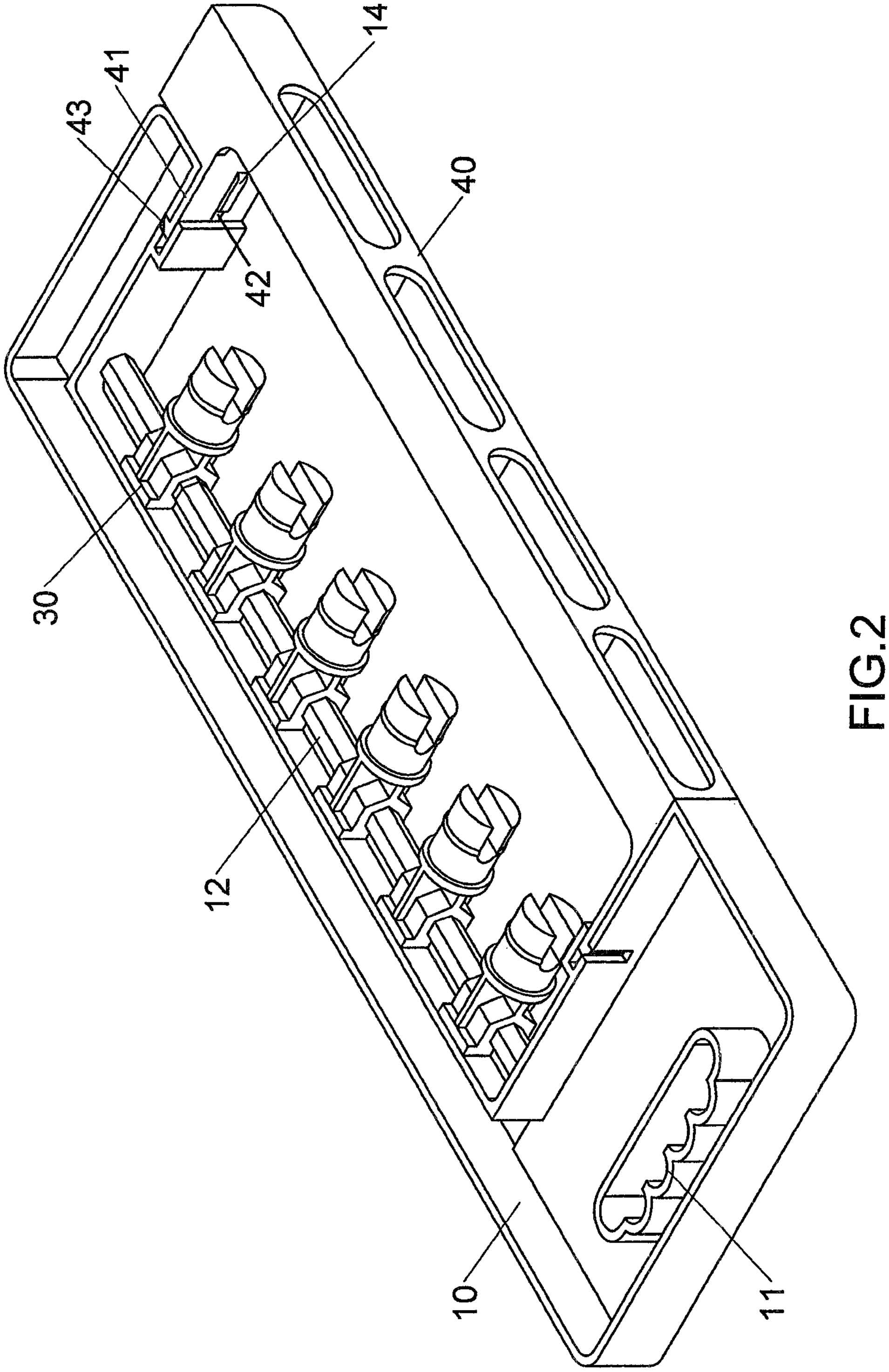
FIG. 2 is an assembled perspective view of the hand tool rack in accordance with the present invention.

Referring to FIGS. 1 to 2, the hand tool rack of the present invention comprises a main frame 10, a plurality of positioning members 30 and at least a cover frame 40. The mechanism of the hand tool rack is detailed as following.

The main frame 10 is a one-piece molded plastic whose one end has a hollow portion as a hand grip 11 for holding or hanging. A pair of side panels 100 is laterally extended in parallel beneath the hand grip 11, and a mediate portion 101 is longitudinally extended between the side panels 100. A first hook trough 15 and a lump 14 are symmetrically designated on each side panel 100. A longitudinal strip panel 102 is attached to the inner side of the mediate portion 101, and one longitudinal side of the strip panel 102 is joined to a polygonal guide rail 12. The guide rail 12 is disconnected by a rail gap 13 which allows a rail filling 20 to lodge in for the guide rail 12 to be a completed form. A locking piece 16 is also symmetrically designated on each side panel 100, and a locking trough 17 is formed between the locking piece 16 and the side panel 100 thereof. The locking trough 17 has a locking opening 170 laterally defined towards the main frame 10. The lump 14 is longitudinally directed to the locking opening 170 and the first hook trough 15 is located within the locking trough 17.

Each positioning member 30 includes a first end and a second end. The first end allows a hand tool to mount with (especially for hand tools with quadrilateral grooves such as sockets, adapters, extension bars or universal joints). The second end of each positioning member 30 is attached onto the mediate portion 101. A portion near the second end the positioning member 30 is provided a laterally penetrated rail sleeve 32 whose contour matches to the cross-section shape of the guide rail 12. An opening 320 is provided on the second end of the positioning member 30 and connects to the rail sleeve 32, and the width of the opening 320 matches to the thickness of the strip panel 102. The distal end of the second end of the positioning member 30 forms a prop surface 31 as well to prop the positioning member 30 against the mediate portion 101.

The cover frame 40 has two brace pieces 41 laterally extended from its two ends respectively. On each brace piece 41, a hook 43 is stuck out and a guiding slot 42 is longitudinally depressed from the distal end of the brace piece 41. When the brace pieces 41 are hooked with the side panels 100, each hook 43 is clipped into the corresponding first hook trough 15 and each lump 14 is lodged into the corresponding guiding slot 42 as well. The cover frame 40 also has a plurality of penetrating slots 44.

Figure 3:
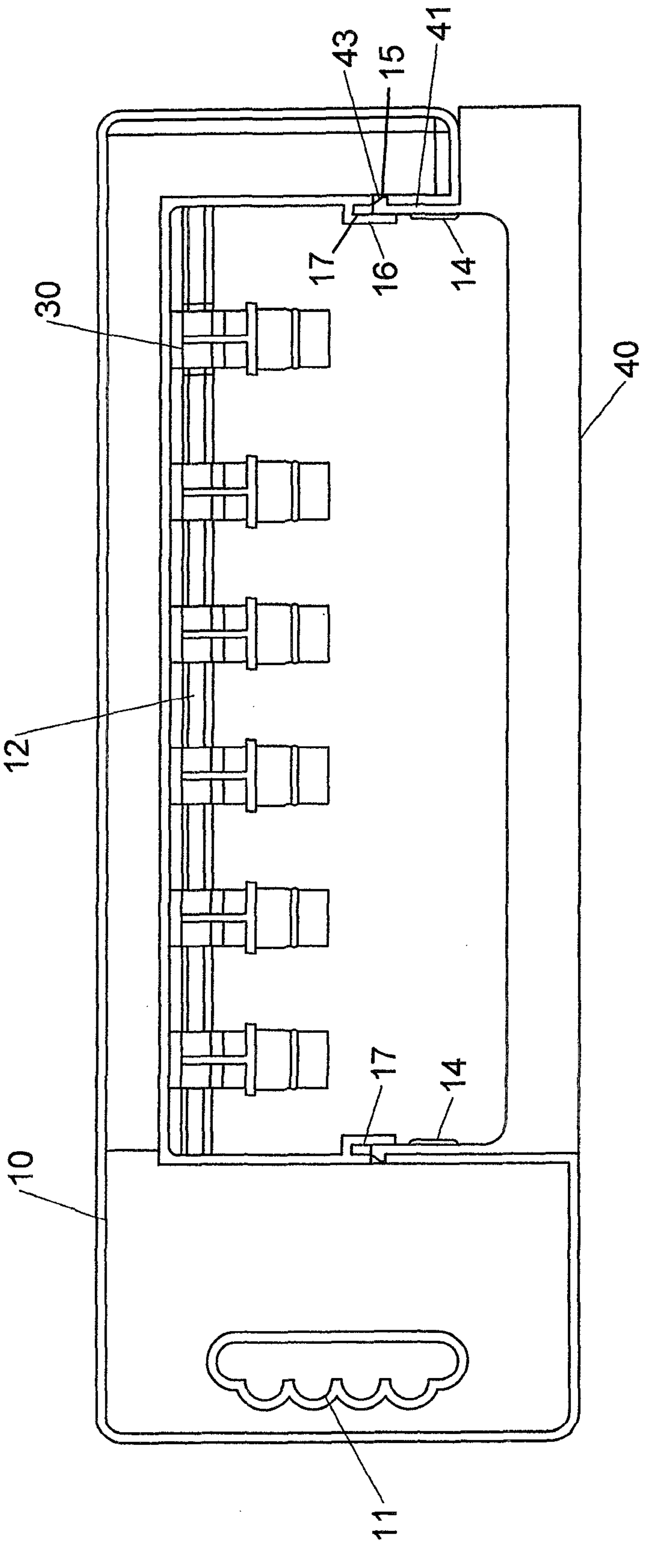
FIG. 3 is a top view of the hand tool rack in accordance with the present invention.
Figure 4:
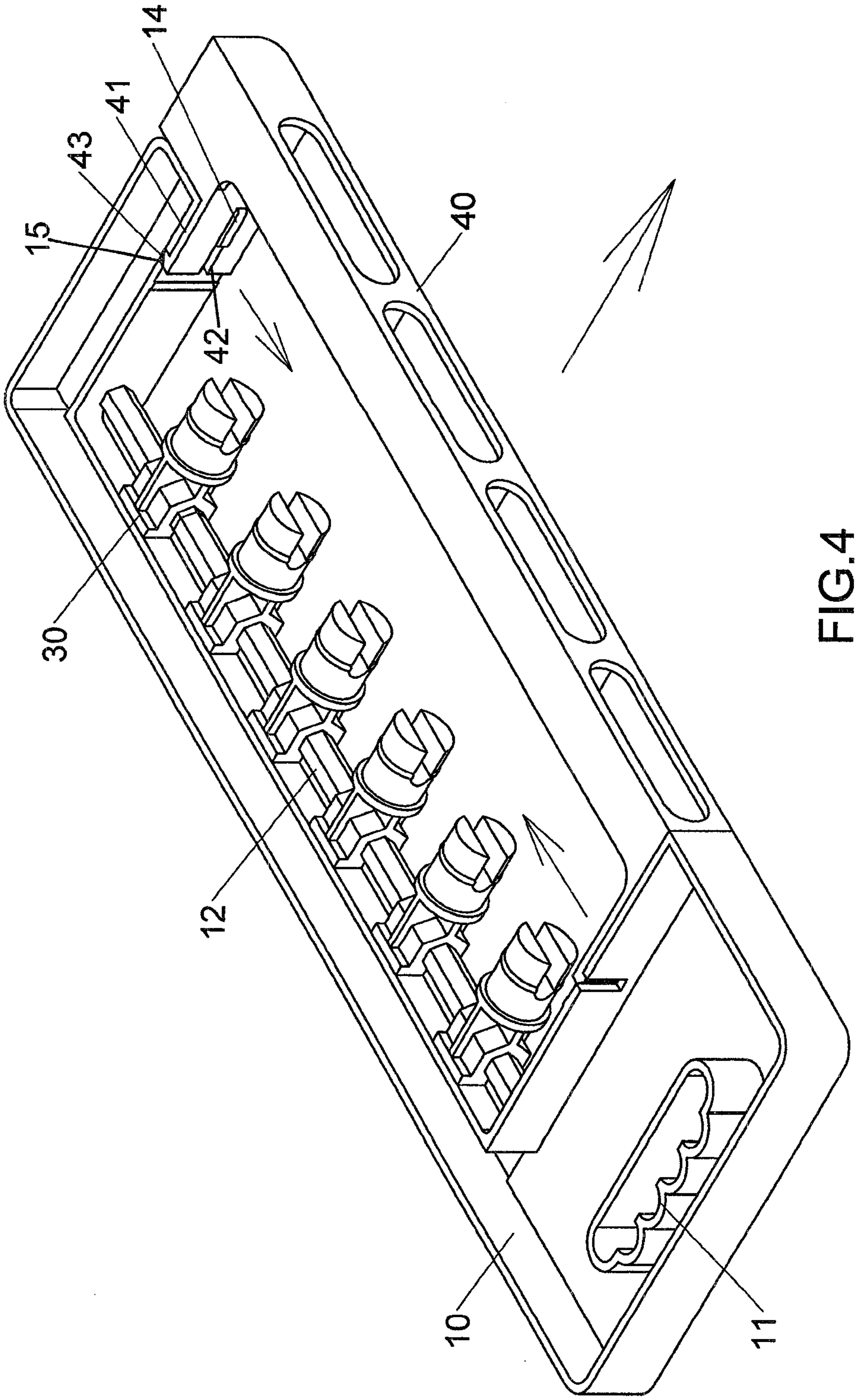
FIG. 4 is an operational perspective view of the hand tool rack in accordance with the present invention.
Figure 5:
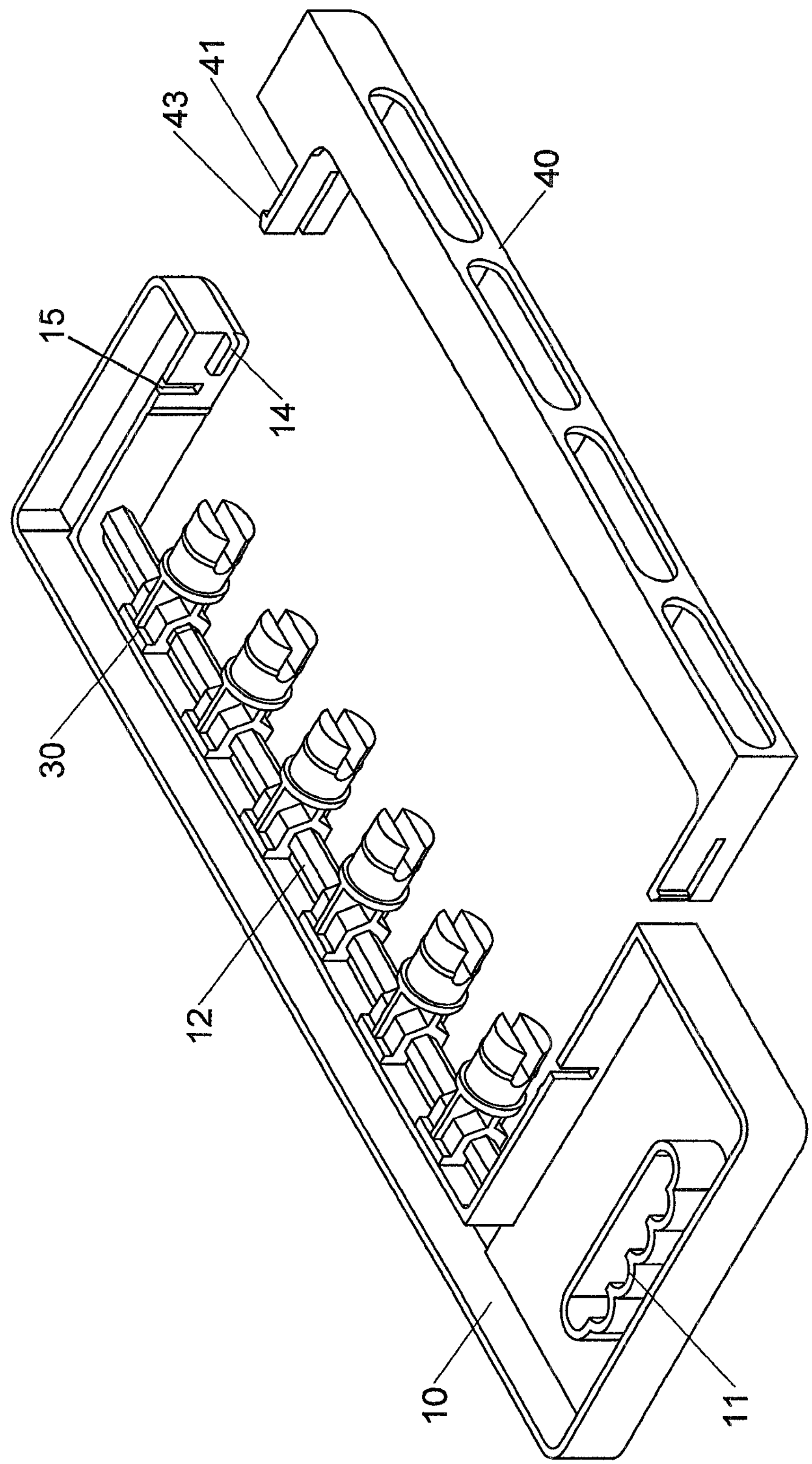
FIG. 5 is an assembled perspective view of the hand tool rack in accordance with the present invention.

Referring to FIGS. 3 to 5, the hook 43 is clipped into the first hook trough 15 and lump 14 is lodged into the guiding slot 42 for the cover frame 40 to be fastened onto the main frame 10. Inasmuch as the lump 14 is lodged in the guiding slot 42 and the brace piece 41 is limited by the locking trough 17, the cover frame 40 is able to be fastened onto the main frame 10 with anti-theft function. When a user is about to retrieve the hand tools, the locking piece 16 can be cut off first for the brace piece 41 to be relieved and for the hook 43 to be removed from the first hook trough 15 and then the cover frame 40 can be pulled apart from the main frame 10 for the user to retrieve the hand tools.

Figure 6:
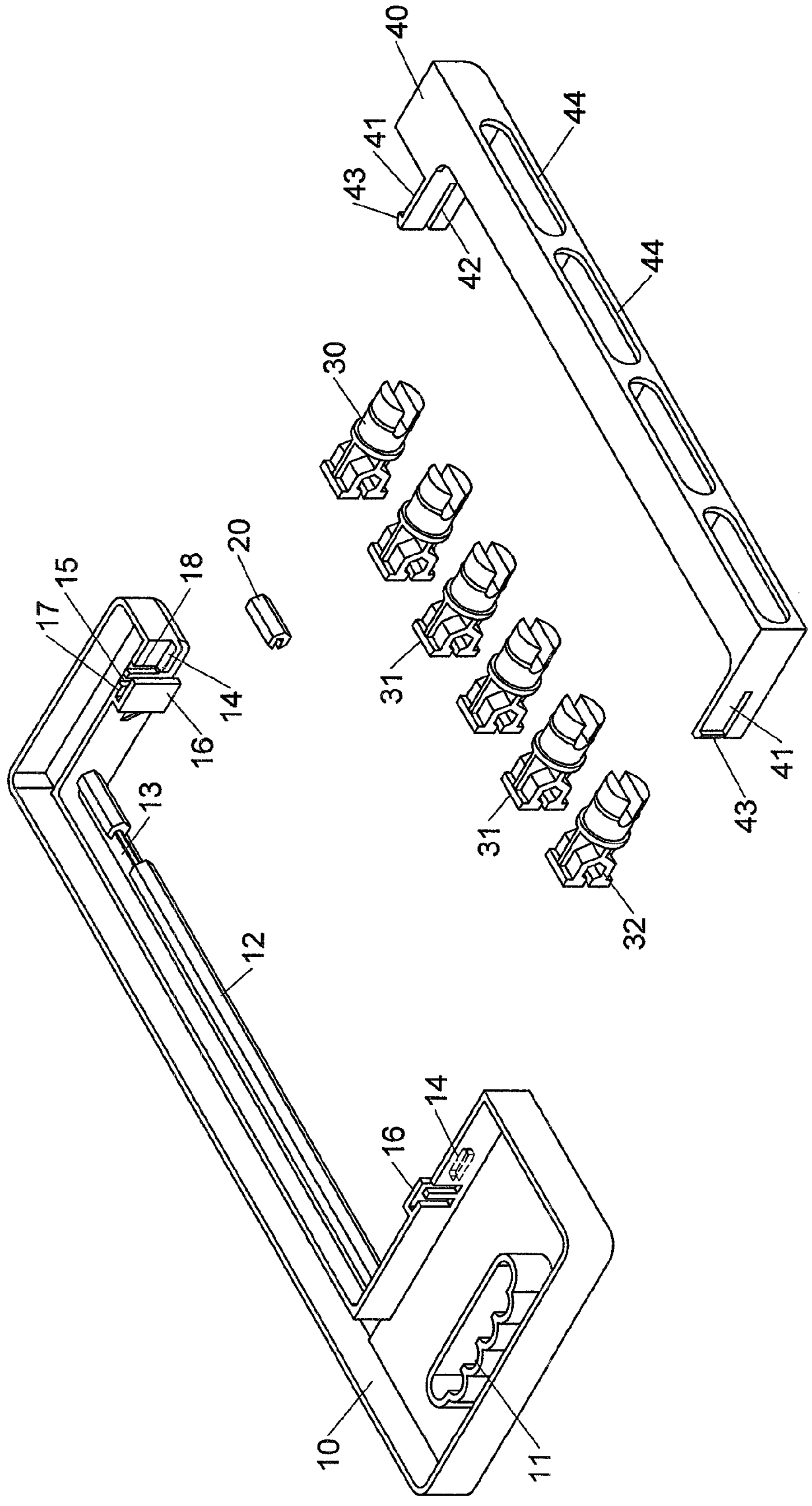
FIG. 6 is an exploded perspective view of the hand tool rack of the second embodiment in accordance with the present invention.
Figure 7:
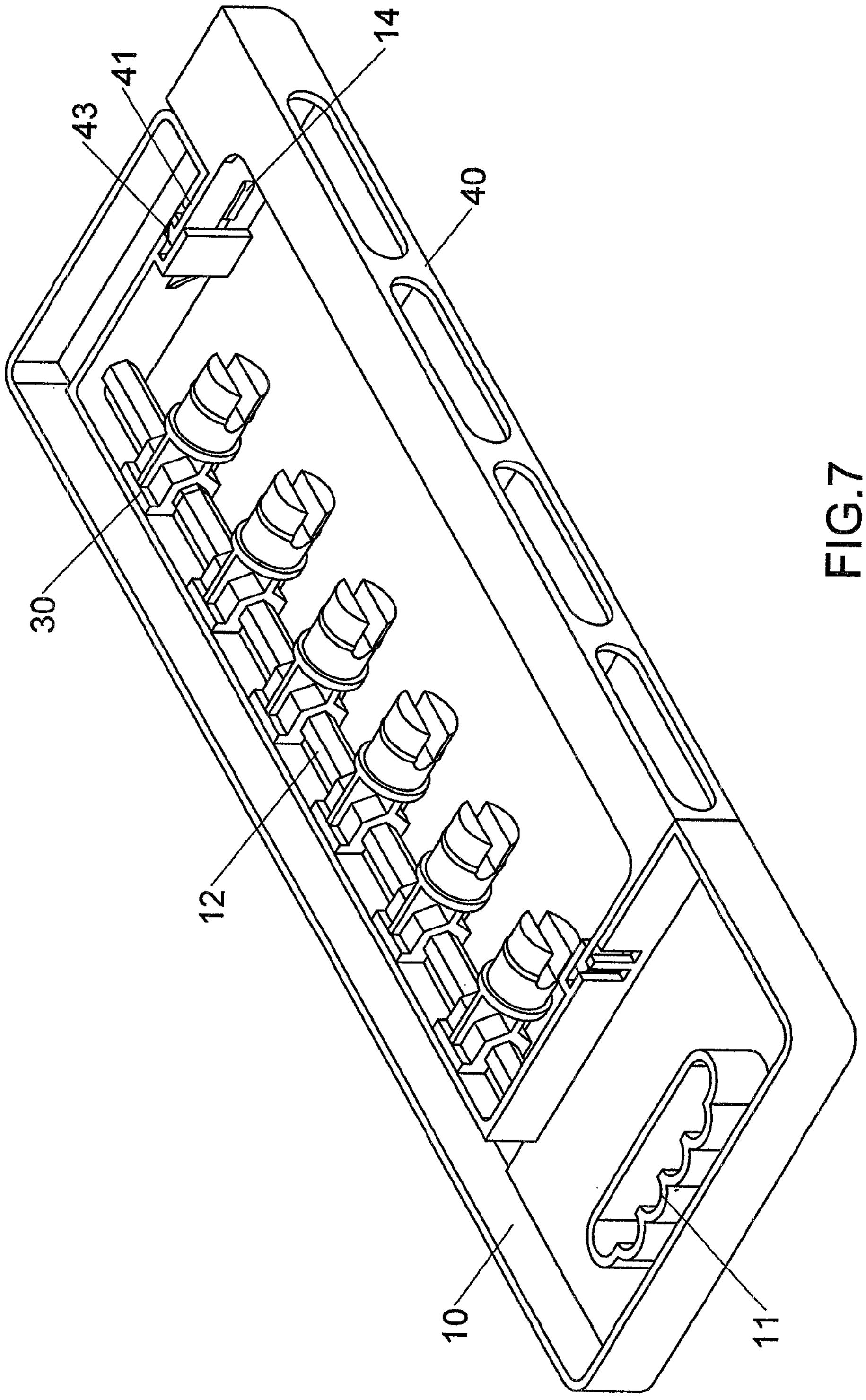
FIG. 7 is an assembled perspective view of the hand tool rack of the second embodiment in accordance with the present invention.
Figure 8:
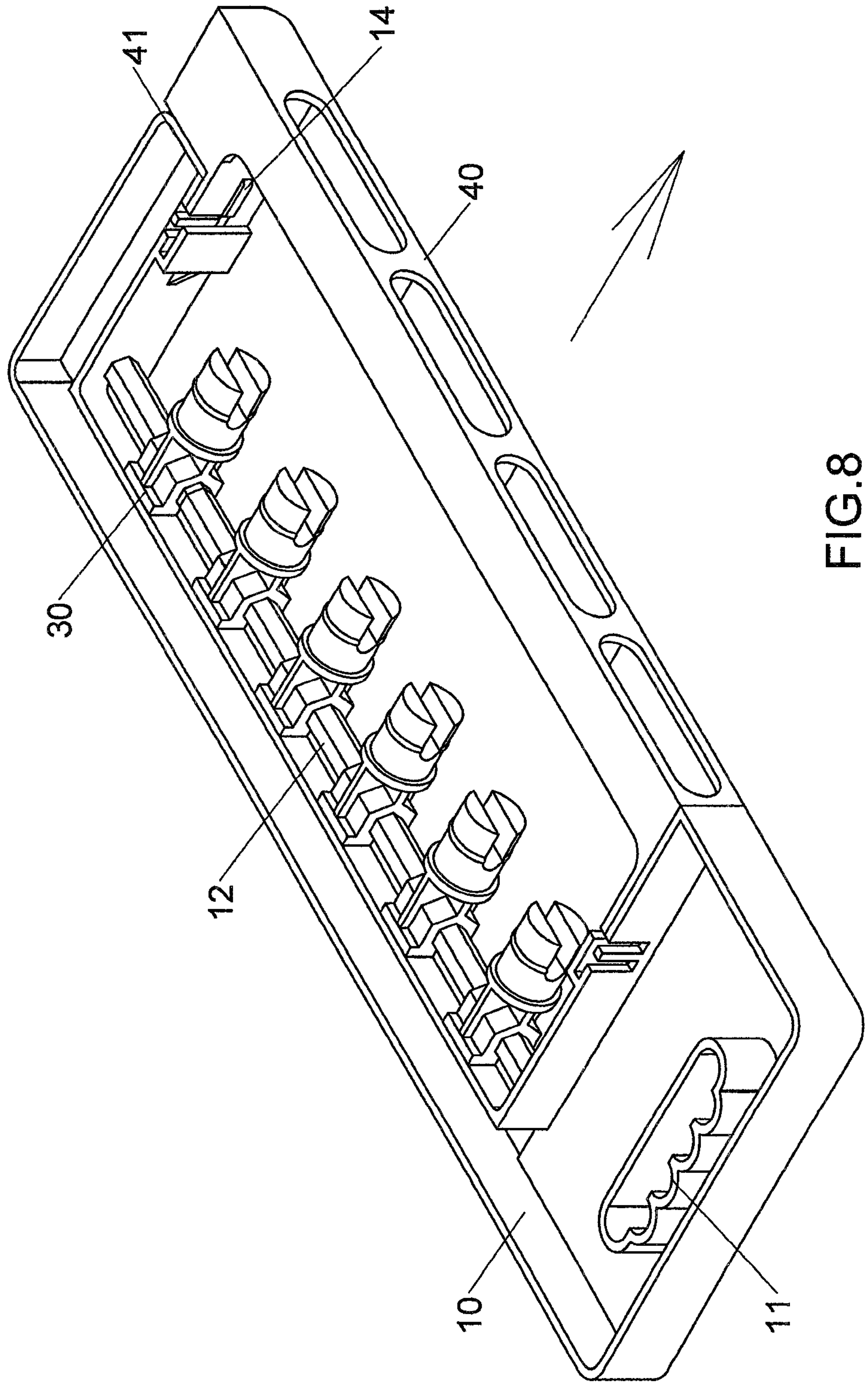
FIG. 8 is an operational perspective view of the hand tool rack of the second embodiment in accordance with the present invention.

Referring to FIGS. 6 to 8, the two opposite side panels 100 of the main frame 10 have two second hook troughs 18 respectively defined outside the locking troughs and between the first hook troughs 15 and the lumps 14. The second hook trough 18 and the first hook trough 15 are the same shape and longitudinally extended towards one side of the side panels 100. When the cover frame 40 is about to be detached from the main frame, the locking piece 16 can be cut off or the hook 43 of the brace piece 41 can be cut off from the inner side of the second hook trough 18 to detach the cover frame 40 apart from the main frame 10.

Figure 9:
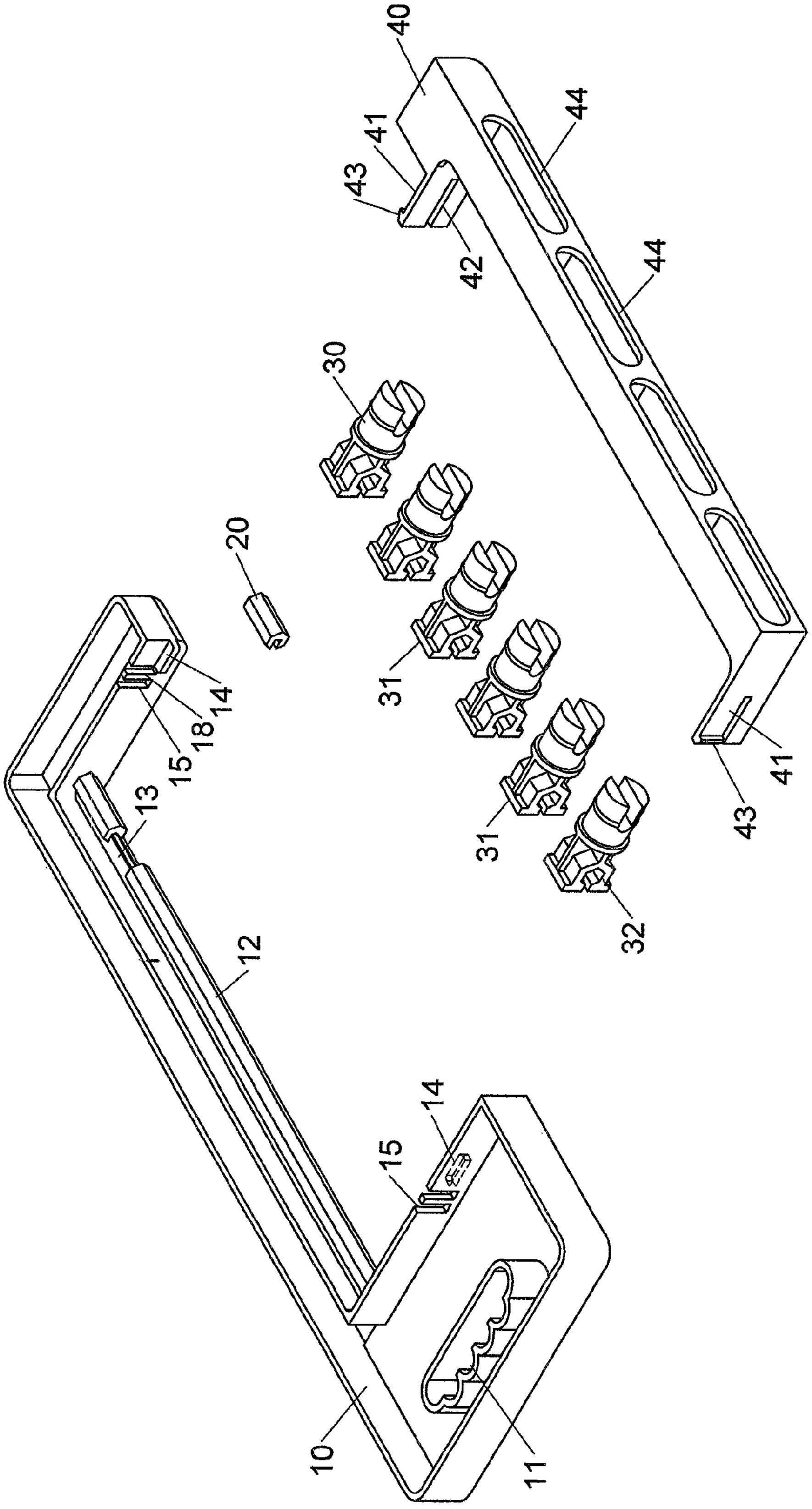
FIG. 9 is an exploded perspective view of the hand tool rack of the third embodiment in accordance with the present invention.
Figure 10:
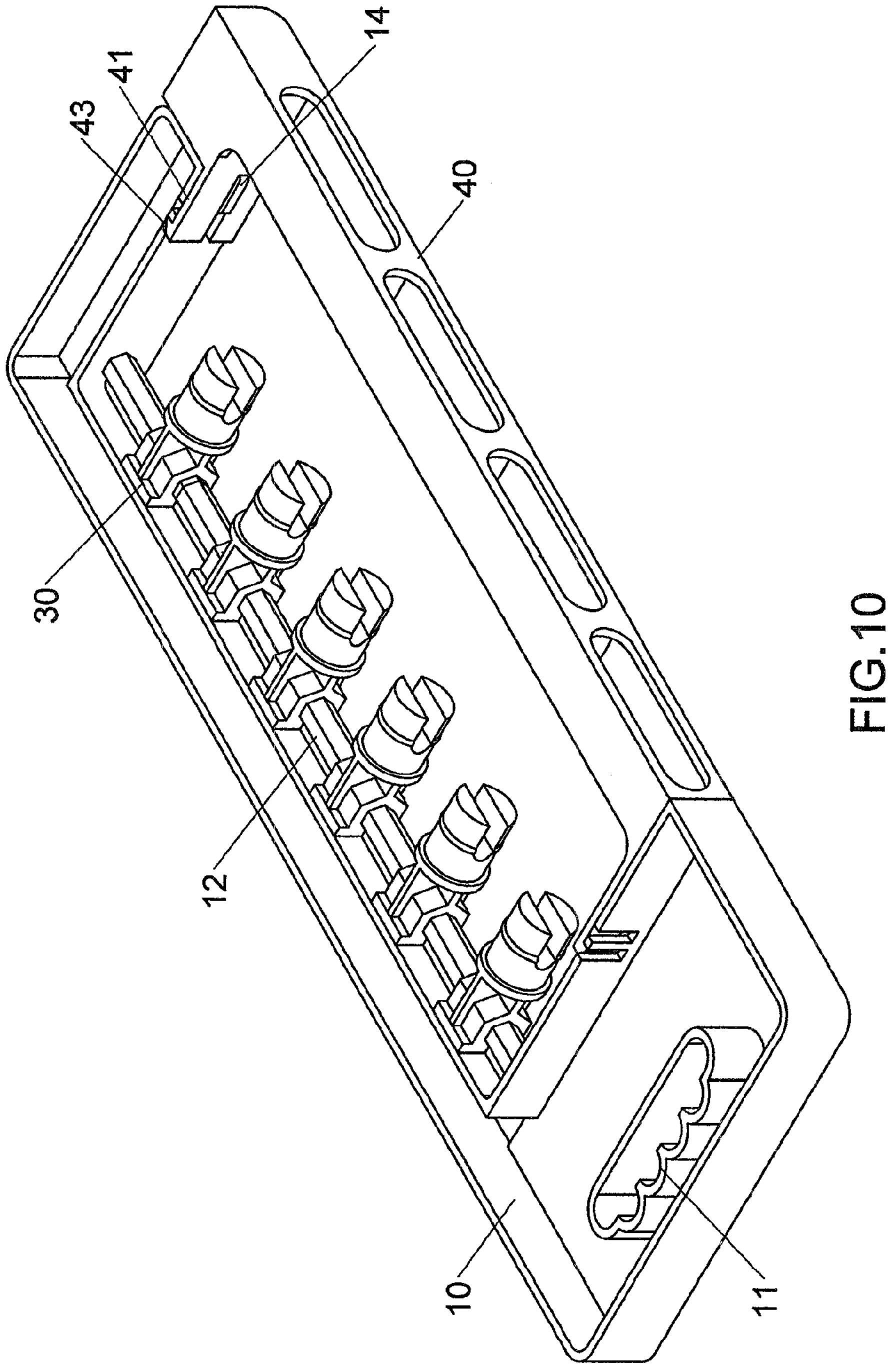
FIG. 10 is an assembled perspective view of the hand tool rack of the third embodiment in accordance with the present invention.

Referring to FIGS. 9 to 10, the main frame 10 does not have locking pieces 16 and the brace pieces 41 are more rigid. When the cover frame 40 is about to be detached from the main frame, the brace piece 41 can be pressed hard enough for the hook 43 to be removed from the first hook trough 15 or the hook 43 can be cut off from the inner side of the second hook trough 18 to detach the cover frame 40 apart from the main frame 10.

Figure 11:
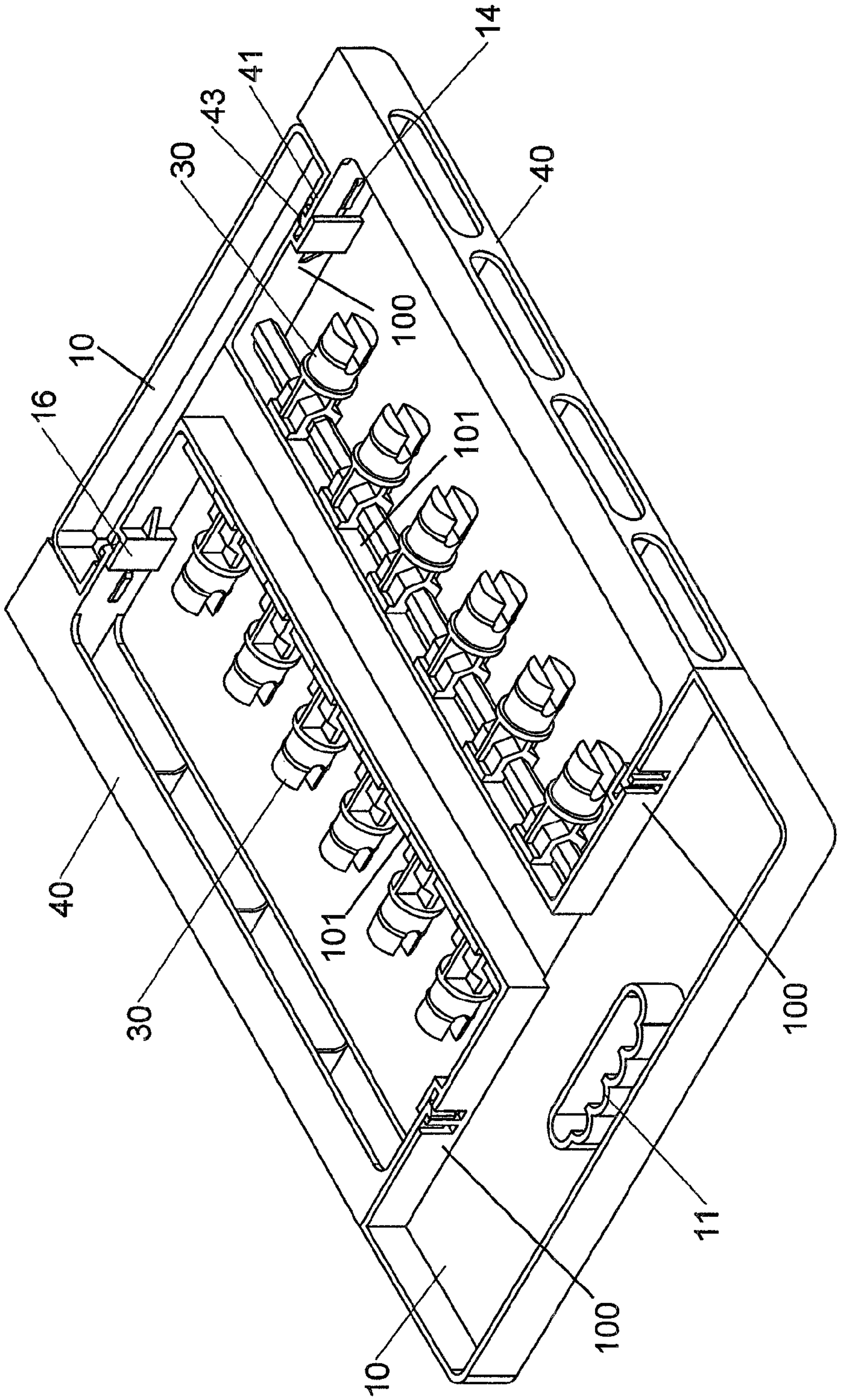
FIG. 11 is an assembled perspective view of the hand tool rack of the fourth embodiment in accordance with the present invention.

Referring to FIG. 11, the main frame 10 has two sets of side panels 100 and guide rails 12 symmetrically extended on two sides with two cover frames 40. The mechanism of each component is identical to the structure depicted in FIG. 1.

Figure 12:
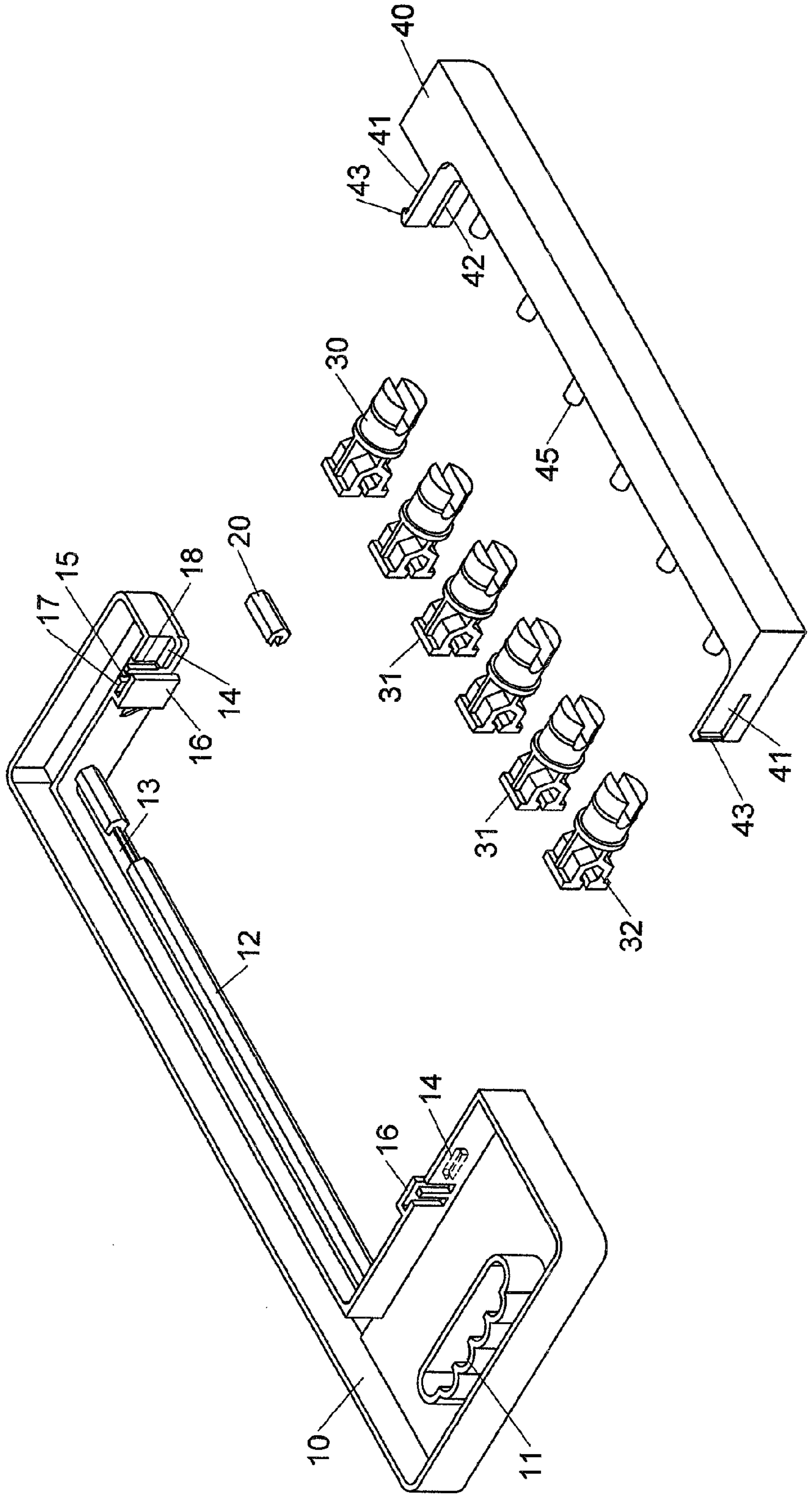
FIG. 12 is an exploded perspective view of the hand tool rack of the fourth embodiment in accordance with the present invention.

Referring to FIG. 12, in one embodiment of the present invention, there a plurality of protruded columns 45 defined on the cover frame 40. Each protruded column 45 is corresponding to a positioning member 30 for two ends of a hand tool to recess.

While we have shown and described the embodiment in accordance with the present invention, it should be clear to those skilled in the art that further embodiments may be made without departing from the scope of the present invention.

What is claimed is:

1. A hand tool rack comprising:

a main frame including at least a pair of laterally extending side panels, a mediate portion longitudinally extending between the side panels, and each side panel being provided a first hook trough and a lump thereon;

a plurality of positioning members each having a first end and a second end, the first end being for one end of a hand tool to mount with and the second end being attached onto the mediate portion; and at least a cover frame with two brace pieces laterally extending from two ends of the cover frame respectively, on each brace piece being a protruding hook and a guiding slot being longitudinally formed from distal ends of the brace pieces, the brace pieces being hooked with the side panels, each hook being clipped into the corresponding first hook trough and each lump being lodged into the corresponding guiding slot.

2. The hand tool rack as claimed in claim 1, wherein a strip panel is attached to an inner side of the mediate portion and the one longitudinal side of the strip panel is joined to a polygonal guide rail; the guide rail has a rail gap; a portion of the positioning member near the second end of the positioning member is defined a laterally penetrated rail sleeve thereon, the contour of the rail sleeve matches to the cross-section shape of the guide rail; the second end of the positioning member is defined an opening thereon connecting to the rail sleeve, and the width of the opening matches to the thickness of the strip panel.

3. The hand tool rack as claimed in claim 2, wherein the rail gap is lodged with a rail filling so that the guide rail can be a completed form.

4. The hand tool rack as claimed in claim 1, wherein two locking pieces are symmetrically designated on the two side panels respectively and a locking trough is formed between the locking piece and the side panel thereof, the locking trough has a locking opening laterally defined towards the main frame, the lump is directed to the locking opening, and the first hook trough is located within the locking trough.

5. The hand tool rack as claimed in claim 4, wherein each side panels has a second hook trough, the first hook trough and the first hook trough longitudinally extending towards one side of the side panel, and the second hook trough is located outside the locking trough and between the hook trough and the lump.

6. The hand tool rack as claimed in claim 1, wherein one end of the main frame has a hollow portion as its a hand grip for holding or hanging.

7. The hand tool rack as claimed in claim 1, wherein the cover frame has a plurality of penetrating slots.

8. The hand tool rack as claimed in claim 1, wherein a plurality of protruded columns is defined on the cover frame, and each protruded column is corresponding to a positioning member for the other end of the hand tool to mount with.

9. The hand tool rack as claimed in claim 1, wherein the main frame has two sets of side panels, each set of side panels has a corresponding mediate portion, there are two cover frames, and each cover frame is fastened to a corresponding set of side panels.

* * * * *